United States Patent
Liu et al.

(10) Patent No.: US 8,681,015 B1
(45) Date of Patent: Mar. 25, 2014

(54) METHOD AND APPARATUS FOR COLLECTING DATA FROM AUTOMATIC METER READING FOR SMART POWER GRID

(75) Inventors: David Hwa-Wei Liu, Herndon, VA (US); James M. Hallam, Oswego, IL (US); Fung-Chang Huang, Herndon, VA (US)

(73) Assignee: Tellabs Operations, Inc., Naperville, IL (US)

( * ) Notice: Subject to any disclaimer, the term of this patent is extended or adjusted under 35 U.S.C. 154(b) by 256 days.

(21) Appl. No.: 12/823,356

(22) Filed: Jun. 25, 2010

(51) Int. Cl.
*G08C 19/36* (2006.01)
*H04B 10/00* (2013.01)

(52) U.S. Cl.
USPC .................. 340/870.02; 398/116; 398/140

(58) Field of Classification Search
USPC ............. 340/870.01–870.03, 870.11, 870.28; 398/66, 67, 115–117, 140
See application file for complete search history.

(56) References Cited

U.S. PATENT DOCUMENTS

| | | | |
|---|---|---|---|
| 5,892,758 A * | 4/1999 | Argyroudis | 370/335 |
| 6,278,357 B1 * | 8/2001 | Croushore et al. | 375/259 |
| 6,900,738 B2 * | 5/2005 | Crichlow | 340/870.02 |
| 6,947,854 B2 * | 9/2005 | Swarztrauber et al. | 702/62 |
| 2005/0035877 A1 * | 2/2005 | Kim | 340/870.02 |
| 2008/0212964 A1 * | 9/2008 | Gao et al. | 398/58 |
| 2009/0210197 A1 * | 8/2009 | Cleary | 702/187 |

* cited by examiner

*Primary Examiner* — Levi Gannon
(74) *Attorney, Agent, or Firm* — James M. Wu; JW Law Group

(57) ABSTRACT

A communication network system includes a solid-state meter, an optical line terminal ("OLT") based device, and a meter network management device. In one embodiment, the solid-state meter, which can be an electricity meter or a gas meter, provides a measurement, and has a serial communication interface. The OLT based device transfers the information between network devices via a communication network. The meter network management device, which may be an optical network terminal ("ONT"), is capable of communicating with the solid-state meter using the serial communication interface via an RS-232 port.

20 Claims, 6 Drawing Sheets

Rx OMCI Packet Decode: (src=l ts=171364083, tps=200)
   Type: CREATE   Mngd Ent: VENDOR_SPECIFIC   Instance: 65535
   Pri: Lo   Did: 0xa   ar: 1 ak: 0 db: 0 tci 342
   Attributes:
     cmd =
       73 68 6f 77 20 75 70 74 |show power|
       69 6d 65 00 00 00 00 00 |stats   |
       00 00 00 00 00 00 00 00 |     |
       00 00 00 00 00 00 00 00 |     |
       00              |  |

⟩ 502

Tx OMCI Packet Decode: (src=l ts=171364092, tps=200)
   Type: CREATE Rsp   Mngd Ent: VENDOR_SPECIFIC   Instance: 65535
   Pri: Lo   Did: 0xa   ar: 0 ak: 1 db: 0 tci 342
     Result Code: Success (0)

⟩ 504

Tx OMCI Packet Decode: (src=l ts=171364092, tps=200)
   Type: CREATE   Mngd Ent: VENDOR_SPECIFIC   Instance: 65535
   Pri: Lo   Did: 0xa   ar: 0 ak: 0 db: 0 tci 0
   Attributes:
     cmd =
       5b 30 31 5d 20 0a 00 00 | Data Collected from Meter |
       00 00 00 00 00 00 00 00 | Data Collected from Meter |
       00 00 00 00 00 00 00 00 | Data Collected from Meter |
       00 00 00 00 00 00 00 00 | Data Collected from Meter |

⟩ 506

Tx OMCI Packet Decode: (src=l ts=171364092, tps=200)
   Type: CREATE   Mngd Ent: VENDOR_SPECIFIC   Instance: 65535
   Pri: Lo   Did: 0xa   ar: 0 ak: 0 db: 0 tci 0
   Attributes:
     cmd =
       5b 30 31 5d 20 2a 2a 2a | Data Collected from Meter |
       2a 2a 2a 2a 2a 2a 2a 2a | Data Collected from Meter |
       2a 2a 2a 2a 2a 2a 2a 2a | Data Collected from Meter |
       2a 2a 2a 2a 2a 2a 2a 2a | Data Collected from Meter |

⟩ 508

Tx OMCI Packet Decode: (src=l ts=171364092, tps=200)
   Type: CREATE   Mngd Ent: VENDOR_SPECIFIC   Instance: 65535
   Pri: Lo   Did: 0xa   ar: 0 ak: 0 db: 0 tci 0
   Attributes:
     cmd =
       5b 30 31 5d 20 2a 2a 2a | Data Collected from Meter |
       2a 2a 2a 2a 2a 2a 2a 2a | Data Collected from Meter |
       2a 2a 2a 2a 2a 2a 2a 2a | Data Collected from Meter |
       2a 2a 2a 2a 2a 2a 2a 2a | Data Collected from Meter |

⟩ 510

Tx OMCI Packet Decode: (src=l ts=171364092, tps=200)
   Type: CREATE   Mngd Ent: VENDOR_SPECIFIC   Instance: 65535
   Pri: Lo   Did: 0xa   ar: 0 ak: 0 db: 0 tci 0
   Attributes:
     cmd =
       5b 30 31 5d 20 2a 2a 2a | Data Collected from Meter |
       2a 2a 2a 2a 2a 2a 2a 2a | Data Collected from Meter |
       2a 2a 2a 2a 2a 2a 2a 2a | Data Collected from Meter |
       2a 2a 2a 2a 2a 2a 2a 2a | Data Collected from Meter |

METHOD AND APPARATUS FOR COLLECTING DATA FROM AUTOMATIC METER READING FOR SMART POWER GRID

FIELD

The technical field of embodiments of the present invention relate to communication networks. More specifically, embodiments of the present invention relate to collecting data from automatic meter reading using a communications network.

BACKGROUND

With continuously increasing demand in energy such as electricity and water, various resource providers such as power suppliers and water companies are resorting ways of using available resources more efficiently with new technologies. Instead of broadcasting power, a smart grid, which is recently proposed technology, is designed to monitor and distribute electrical power more efficiently. The proposed smart grid technology, for example, is able to create an intelligent power monitoring system capable of tracking electricity flow between users and power suppliers. To use power more efficiently, home appliances such as washing machines can be selectively activated in accordance with electrical load profiles reported by the smart grid. The smart grid is also known as smart electric grid, smart power grid, intelligent grid, FutureGrid, intergrid, intragrid, et cetera.

To effectively distribute the power, a critical aspect is communications of power usage or power consumption between consumers and providers whereby the providers can use the smart grid to distribute the power according to the consumption or demand. The smart grid, for example, may use a central database of power grid to keep track of the power consumption wherein the central database is being updated frequently or continuously. To monitor power consumption, a mechanism of transporting the consumption data or load profile collected by measure devices from each end user to the head end such as power supply(s) is needed. Conventional measuring devices such as electricity meters or water meters are commonly placed at residential and/or business facilities. Collecting the consumption data or load profile related to power usage has been a challenging and difficult task for power companies.

Traditionally, electricity meter readings (or legacy electricity meters) are done manually where technicians travel onsite to each of the electricity meter and copy down kilowatts and hour utilization, and then the recorded data is manually brought back to the head end for processing. To enhance readability of electricity meter, low power radio signals, such as Bluetooth and IrDA (Infrared Data Association), have been deployed to design new measuring devices, also known as smart meter, so that onsite manual reading can be avoided or reduced. To read the data from such newer electricity meters, a technician, however, still have to drive his/her specially equipped vehicle to each neighborhood and collect the data or load profile from the vehicles automatically once the vehicle reaches to the neighborhood.

A problem associated with the conventional method of collecting load profile or consumption data from a legacy meter or smart meter is that it is slow and time consuming.

SUMMARY

A communication network system includes a solid-state meter, an optical line terminal ("OLT") based device, and a meter network management device. In one embodiment, the solid-state meter, which can be an electricity meter or a gas meter, provides a measurement, and has a serial communication interface. The OLT based device facilitates information between network devices via a communication network. The meter network management device, which may be an optical network terminal ("ONT"), is capable of communicating with the solid-state meter using the serial communication interface via an RS-232 port.

Additional features and benefits of the exemplary embodiment(s) of the present invention will become apparent from the detailed description, figures and claims set forth below.

BRIEF DESCRIPTION OF THE DRAWINGS

Exemplary embodiment(s) of the present invention will be understood more fully from the detailed description given below and from the accompanying drawings of various embodiments of the invention, which, however, should not be taken to limit the invention to the specific embodiments, but are for explanation and understanding only.

FIG. 5 illustrates messages transmitted between a meter(s) and a network device through a communications network in accordance with one embodiment of the present invention.

DETAILED DESCRIPTION

Figure 1:
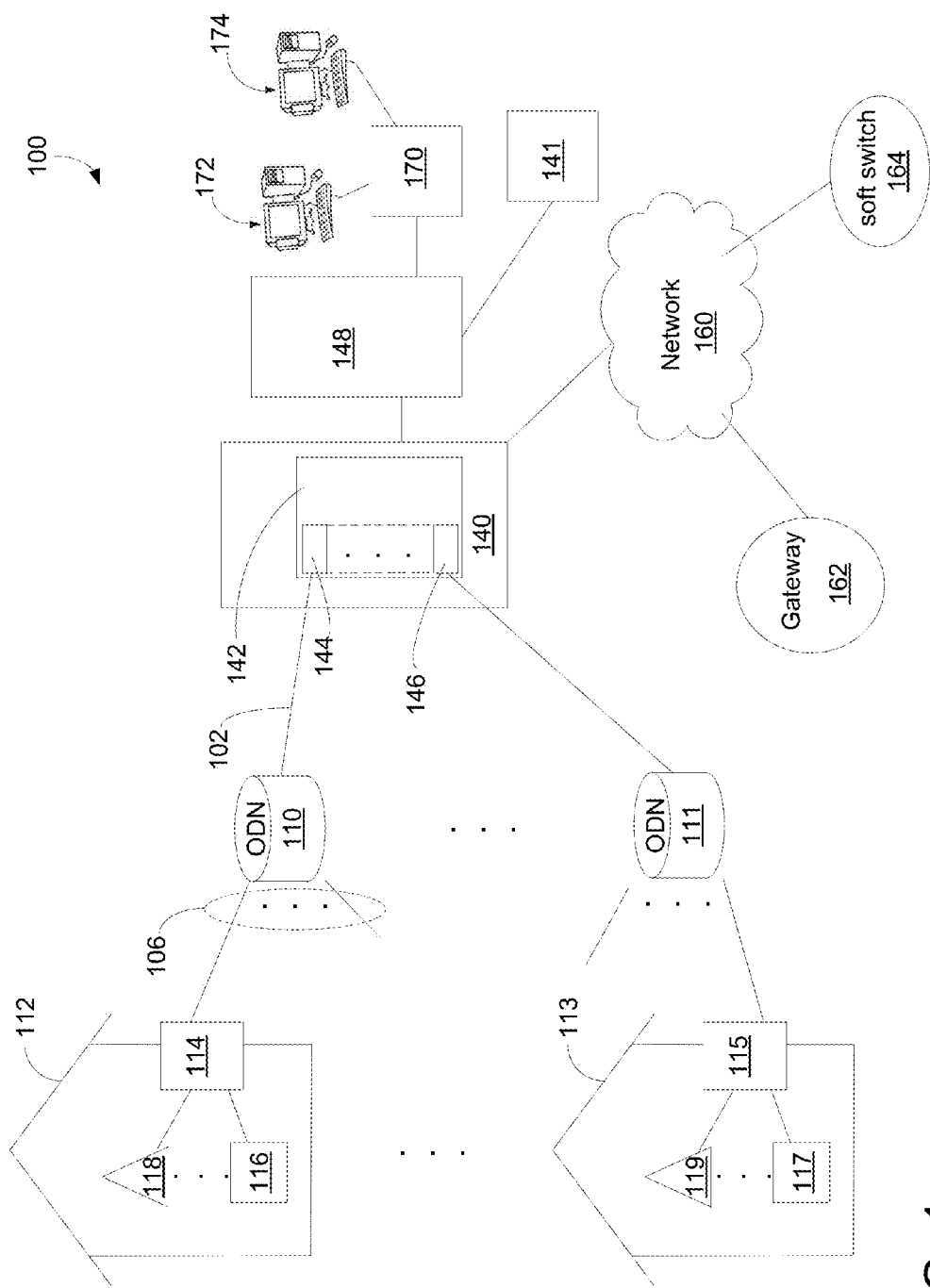
FIG. 1 is a block diagram illustrating a communications network using a meter network management device to remotely access a meter in accordance with one embodiment of the present invention.

Exemplary embodiment(s) of the present invention is described herein in the context of a method, system and apparatus of retrieving load profile via a serial binary communication port of a meter and transporting the load profile via a communications network.

Those of ordinary skills in the art will realize that the following detailed description of the exemplary embodiment(s) is illustrative only and is not intended to be in any way limiting. Other embodiments will readily suggest themselves to such skilled persons having the benefit of this disclosure. Reference will now be made in detail to implementations of the exemplary embodiment(s) as illustrated in the accompanying drawings. The same reference indicators will be used throughout the drawings and the following detailed description to refer to the same or like parts.

In accordance with embodiments of the present invention, the components, process steps, and/or data structures described herein may be implemented using various types of operating systems, computing platforms, computer programs, and/or general purpose machines. In addition, those of ordinary skills in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. Whereas a method including a series of process steps is implemented by a computer, a router, a network device, or a machine and those process steps can be stored as a series of instructions readable by the machine, they may be stored on a tangible medium such as a computer memory device (e.g., ROM (Read Only Memory), PROM (Programmable Read Only Memory), EEPROM (Electrically Erasable Programmable Read Only Memory), FLASH Memory, Jump Drive, and the like), magnetic storage medium (e.g., tape, magnetic disk drive, and the like), optical storage medium (e.g., CD-ROM, DVD-ROM, paper card and paper tape, and the like) and other known types of program memory.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skills in the art having the benefit of this disclosure.

Embodiment(s) of the present invention discloses a communications network system having a solid-state meter, an optical line terminal ("OLT") based device, and a meter network management device. The solid-state meter, which can be an electricity meter or a gas meter, provides a measurement of usage, and is able to communicate with other devices via its serial communication interface. The OLT based device or OLT is able to transfer information relating to the measurement across a communications network. The meter network management device, which can be an optical network terminal ("ONT"), communicates with the solid-state meter via a serial communication interface through an RS-232 port while communicating with OLT via a communications network.

FIG. 1 is a block diagram illustrating a communications network system 100 using a meter network management device to remotely access information stored in a meter in accordance with one embodiment of the present invention. System 100, in one embodiment, includes a fiber to the premises optical network architecture, which is able to distribute optical and/or electrical signals from a central office 140 to one or more optical network terminals or optical network terminations ("ONTs") 114-115. ONTs 114-115 generally reside at customers' or users' premises 112-113. System 100 further includes NMS 148, central offices 140-141, a network connection 160, and optical distribution networks ("ODNs") 110-111. Network connection 160 can be used to further connect to other wired networks and/or wireless networks via switching devices such as gateway 162 and soft switch 164.

Central office 140, in one example, includes an optical line termination ("OLT") 142. Each OLT 142 is capable of supporting a group of passive optical networks ("PONs") 144-146 wherein each PON is able to couple with one or more ODNs. Each ODN provides optical data transmission between a PON and one or more ONTs. For example, a PON may be configured to support up to 64 ONTs. NMS 148 is coupled to one or more central offices 140-141, and a server 170. Server 170 is used to support user interfaces with users 172-174 wherein they can be network operators and/or other servers (or processing devices). A function of NMS 148 is to process and display information such as load profile to clients such as users 172 or 174.

ONT 114, as shown in FIG. 1, is physically situated at customer's premise 112, wherein premise 112 further includes various local communication devices (or equipments) 118 and a meter(s) 116. While device 118 may be a wired or wireless computing device such as a personal computer and/or a set-top-box ("STB"), meter 116 may be a new or legacy electricity meter capable of measuring power consumption of premise 112. A function of ONT is to convert signal format between optical signals and electrical signals. For instance, ONT 114 receives optical signals from a corresponding ODN 110 and subsequently converts the optical signals to electrical signals before the electrical signals are being transmitted to meter 116. Similarly, ONT 114 receives electrical signals from meter 116 via an RS232 port, and then converts the electrical signals to optical signals before being transmitted to ODN 110. It should be noted that ONT 115 is coupled to local devices 117-119 at customer's premise 113 and performs similar functions as ONT 114.

OLT 142 is located at central office 140 and is coupled to multiple PONs 144-146. Depending on the applications, OLT 142 can be configured to manage one or more PONs. PONs such as PONs 144-146 are coupled to multiple ODNs such as ODNs 110-111, as illustrated in FIG. 1. A function of each ODN is to split a single optical fiber into multiple optical fibers for geographic coverage. For example, PON 144 feeds a single optical fiber to ODN 110 and ODN 110 subsequently splits the single optical fiber to multiple optical fibers feeding to multiple ONTs including ONTs 114. In one embodiment, OLT 142 is configured to provide various metering commands to manage and/or read the meters situated at other end of the network.

Referring back to FIG. 1, NMS 148 is used to maintain and monitor a communications network. For example, NMS 148 provides functions for controlling, planning, allocating, deploying, coordinating, and monitoring the resources of a network, including performing functions, such as fault management, configuration management, accounting management, performance management, and security management ("FCAPS"). While the configuration management identifies, simplifies, and tracks the network configuration, the accounting management identifies and collects usage statistics for the customers or users. The performance management determines the efficiency of the current network, such as throughput, percentage utilization, error rates and response time.

ONT 114, in one embodiment, is configured to be a meter network management device that includes a serial binary communication port capable of transmitting and receiving information to and from meter 116 via a serial binary communication port such as Recommended Standard ("RS") 232 port or RS 485 port. Upon initiating a load profile command, ONT 114 receives the load profile indicating a usage of electricity from meter 116 through its serial binary communication port such as RS232 port. After conversion from electrical signals to optical signals, ONT 114 sends the load profile to OLT 140. ONT 114 and OLT 140, in one aspect, use a network message such as open manage client instrumentation ("OMCI") messages to transport data and/or commands between the ONT and the OLT.

Figure 2:
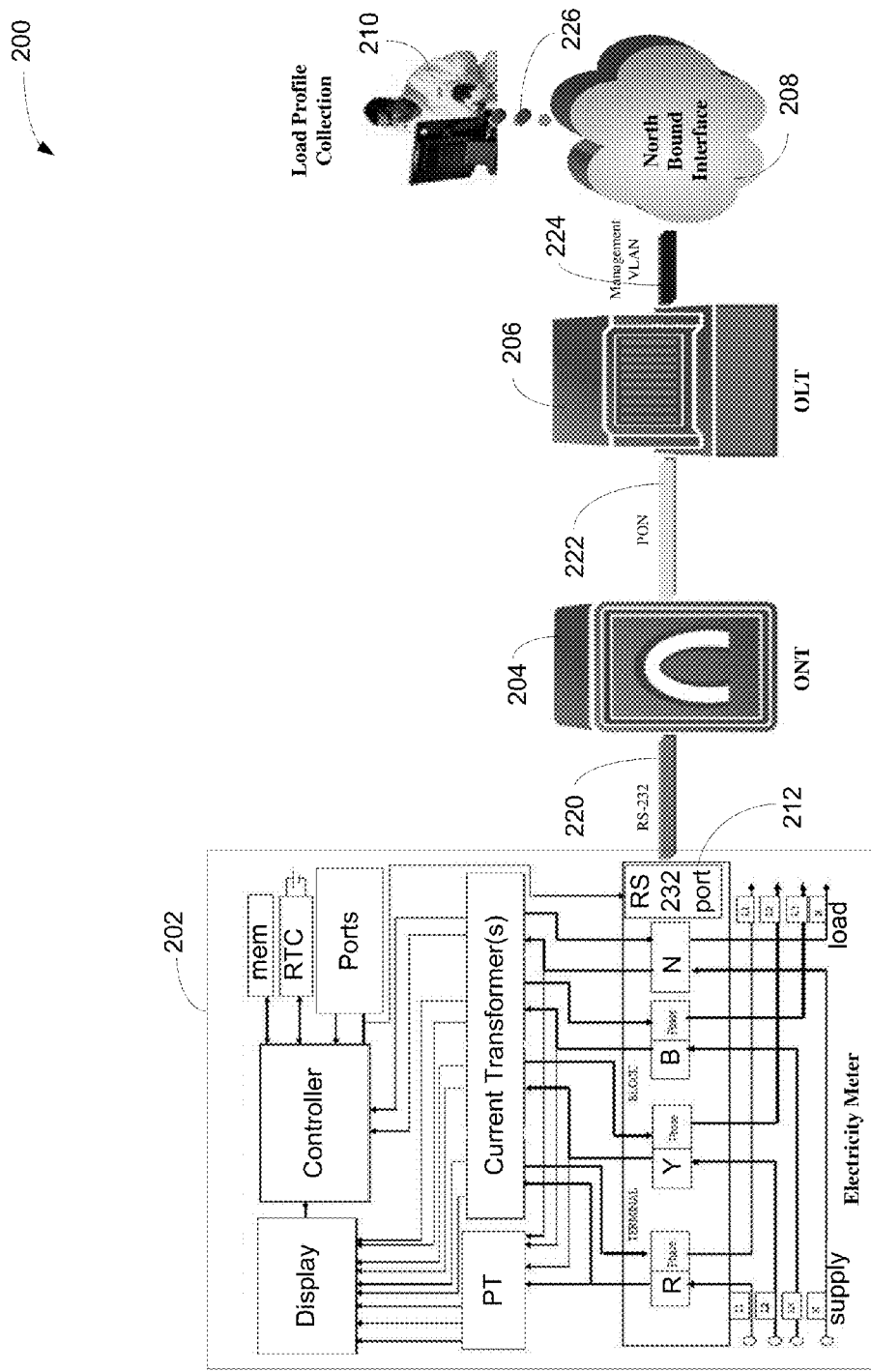
FIG. 2 is a block diagram illustrating a communications network using an optical network terminal ("ONT") to access load profile from an electricity meter in accordance with one embodiment of the present invention.

FIG. 2 is a block diagram illustrating a communications network system 200 using an ONT to access load profile from an electricity meter in accordance with one embodiment of the present invention. System 200 includes an electricity meter 202, an ONT 204, an OLT 206, and a user 210, wherein user 210 is coupled to OLT 206 via a north bound interface ("NBI") 208. Note that other devices such as PONs 222 and ODNs may be installed or placed between OLT 206 and ONT 204. It should be noted that the underlying concept of the embodiment does not change if one or more functional devices were added to or removed from system 200.

Electricity meter 202, in one example, is a solid-state meter configured to provide a measurement of electricity used collectively by a premise. Upon receiving the instruction, meter 202 is able to send its measurement or load profile to ONT 204 via its serial communication interface or RS232 port 212. In one aspect, meter 202 converts and/or saves measured data or load profile into serial binary single-ended data, and subsequently forwards the serial binary single-ended data to ONT 204 via its RS232 port 212. Note that the term "load profile", "measurement", "usage measurement", "measured data", "usage profile information", and "consumption data" can be used interchangeably. It should be noted that the solid-state meter can also be a natural gas meter capable of measuring the usage of natural gas or a water meter configured to measure usage of water at the premise.

In one aspect, electricity meter 202, which can be a new, conventional, or a traditional legacy electricity meter, includes a display, a controller, a potential divider ("PT"), current transformers, and RS232 port 212. While the controller manages usage measurement or load profile, the display indicates the measurement. Meter 202 uses a current transformer(s) to measure current usage or power usage, which allows main current-carrying conductors to bypass meter 202 whereby meter 202 can be located apart from the main current-carrying conductors.

In operation, meter 202 can be a rotating meter that reports the power information using a pair of contacts attached to KYZ lines. Line K is attached to two single pole single throw switches Y and Z wherein Y or Z opens and then closes as the meter's disk rotates. If the disk of the meter rotates in one direction, Y closes, then Z closes, then Y opens, and then Z opens. If the disk of the meter rotates in an opposite direction (indicating exporting power), the sequence of Y and Z reverses. KYZ outputs are attached to "totalizer relays" feeding a "totalizer" so that meters could be read all at once in one place.

At any given time, the usage profile information provided by the electricity meter can be retrieved. Newer meters transmit such information to the data collectors remotely. In many cases, technicians drive out to each neighborhood and are able to collect such information from their car. For a legacy meter such as meter 202, the load profile information can be retrieved locally either by local inspection or by using serial interface via a serial port such as RS-232 and RS-485 port 212.

ONT 204, in one embodiment, is designed to interface with RS-232 interface 212 on meter 202 and provides load profile information upstream to OLT 206. During the configuration of ONT, a 3-pin copper cable 220 is connected between RS232 interface of ONT 204 and RS232 port 212 of meter 202. Note that the 3-pin copper cable may correspond to "transmit", "receive", and "ground" in accordance with the RS232 specifications. The RS232 serial settings on ONT 204 are configured to match with the serial settings of electricity meter 202 including, but not limited to, speed (baud), flow control, stop bits, parity and data bits.

OLT based device or OLT 206 coupled to meter 202 via ONT 204 is responsible for allocating downstream bandwidth to ONT 204 and manages data transmission via ONT 204 including transmission delays due to the varying physical distances from OLT 206 to ONT 204. In the case where OLT 206 is coupled to user 210 via external central office network 224, NMS, and/or NBI 208, OLT 206 facilitates network services between user 210 and meter 202 via PON-based system 222. For example, OLT 206 transfers the measurement obtained from meter 202 to user 210 via a wired communications network and/or a wireless communications network 226.

ONT 204, in one embodiment, is configured to be a meter network management device and is capable of communicating with meter 202, a solid-state meter, via a serial communication interface. ONT 204, for example, employs a RS232 cable 220 for coupling between RS232 port 212 of meter 202 and a serial binary port of ONT 204 for transferring serial binary single-ended data. Upon receipt of meter management command(s) from OLT 206, ONT 204 converts the optical signal to serial binary data, and subsequently sends the serial binary data to meter 202 via RS232 port(s). The meter management commands include, but not limited to, retrieving load profile, usage trend analysis, measurement output controls, authentication controls, alarm activation, pressure sensing, et cetera. After receiving load profile information, ONT 204 converts load profile information from electrical signals to optical signals before sending the load profile information upstream to OLT 206 over a communications network using OMCI message.

Communications network system 200 illustrates an implementation of an ONT to interoperate with electricity meter 202 to provide "Automatic Meter Reading" for supporting the smart grid technology. The data collected from the serial port of the electricity meter 202 will be reported back upstream to the head end using standardized communication protocol such as OMCI message. Similarly, meter management commands from OLT 206 (or user 210) can also be sent downstream to meter 202 via serial port 212.

An advantage of employing embodiments of the present invention is to provide capabilities of automatic meter reading to legacy electricity meters. Another advantage of employing system 200 is that the disclosed embodiments can be applied to any devices that are in close proximity of a power meter and able to transport data back to the head end.

Figure 3:
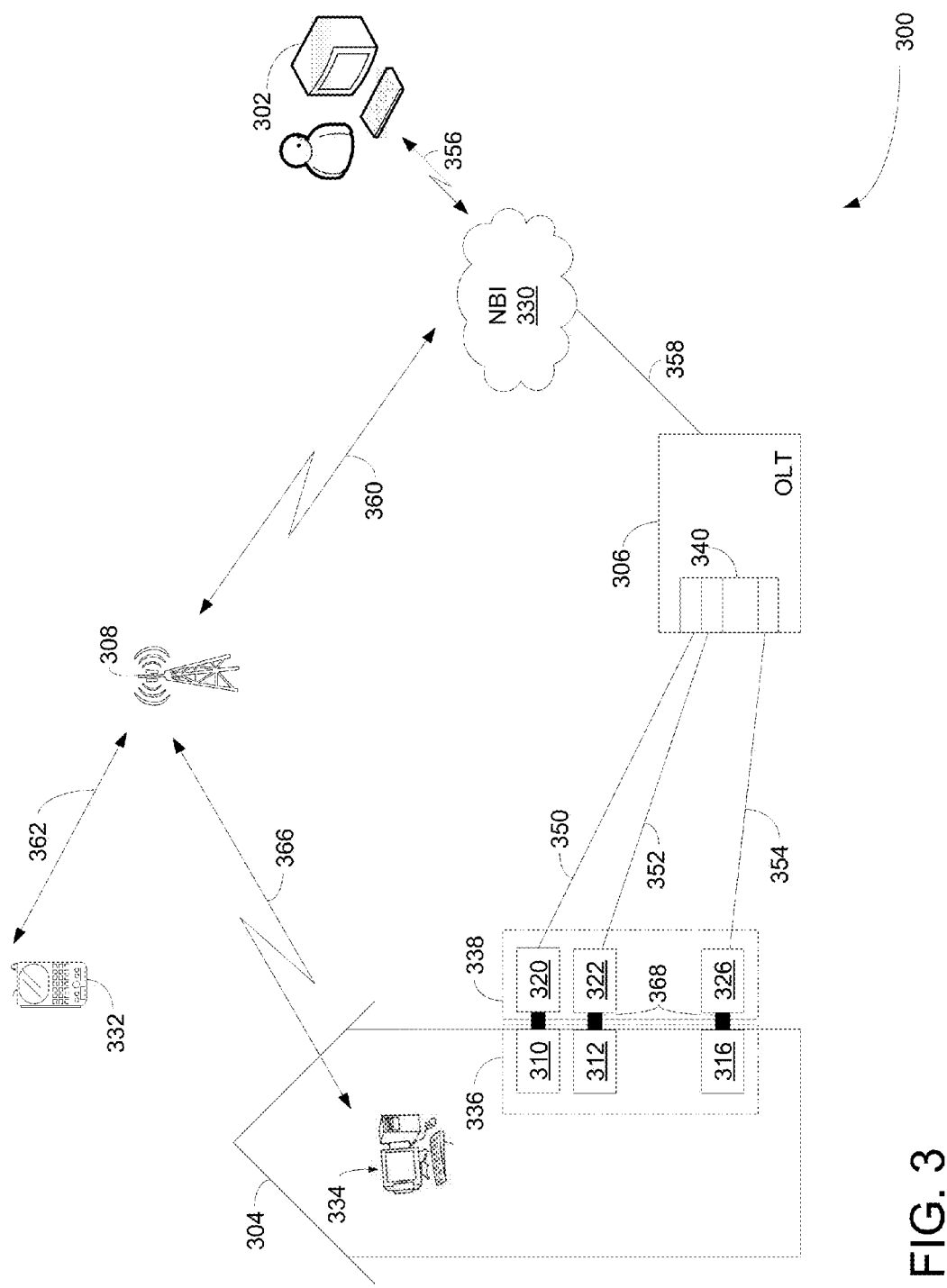
FIG. 3 is a block diagram illustrating a communications network having automatic meter reading capabilities in accordance with one embodiment of the present invention.

FIG. 3 is a block diagram illustrating a communications network system 300 having automatic meter reading capabilities in accordance with one embodiment of the present invention. System 300 includes a user 302, a premise 304, an OLT 306, a base station 308. NBI 330, in one embodiment, is used to provide connections between user 302, OLT 306, and base station 308 via connections 356-360. Connections 356-360 can be either wired, wireless, or a combination of wired and wireless connections. User 302 could be a resource manager, network administrator, power supplier, water company, oil supplier, gas monitor, security companies, over loading warning system, and so forth, for monitoring and managing resource allocations and distributions. It should be noted that the underlying concept of the embodiment does not change if one or more functional devices were added to or removed from system 300.

Premise 304 includes a computer 334 and measuring device 336 which, in one embodiment, includes multiple meters 310-316. While meter 310 may be an electricity meter measuring electricity usage of premise 304, meter 312 may be a water meter indicating water consumption of premise 304. Meter 316 can be a gas meter measuring the usage of natural gas. Meters 310-316, in one aspect, can be a combination of new meters and legacy meters but they all have the capability of transmitting and receiving information through their serial ports or RS232 ports. Note that meters 310-316 do not necessarily have to be separate units and they can be combined into a single measuring device. Computer 334 is connected to a communications network 366 via base station 306. In one embodiment, computer 334 can request or initiate load profile about resource usage of premise 304 via base station 308. Base station 308, in one example, is a relay station configured to forward information between network devices. Base station may use wired or wireless communication medium to transport information.

System 300 illustrates multiple ONTs 320-326 configured to couple with meters 310-316 using multiple serial connections or cables 368 via serial ports. ONTs 320-326 are further coupled to PONs 340 via connections 350-354. Note that ONTs 320-326 do not necessarily have to be separate devices, and ONTs 320-326 can be combined into one measuring device or ONT 338. In this embodiment, ONTs 320-326 are configured to retrieve multiple measurements such as electricity usage and gas usage from meters 310-316 and subsequently send retrieved measurements upstream to OLT 306. Similarly, meters management commands can be facilitated via serial connections 368 from ONTs 320-326 to meters 310-316. In one embodiment, a user or facility manager can be warned of security breach or over loading scenario through a hand held device 332 via base station 308.

With the ability to provide automatic meter reading from an OLT, load profile can be retrieved in real time. Since load profile or measurement data can be retrieved continuously or as needed, the frequency of collection of load profile can be dynamically increased or decreased thereby power usage trend can be analyzed and power distribution can be adjusted in real time. Embodiments of the present invention further provide additional meter management capabilities to provide trend analysis. In addition, outputs of electricity meter, for example, can be fed to programmable logic controllers, HVAC (Heating Ventilation and Air Conditioning) controllers, and/or other control systems to manage other situations such as ambient controls.

For example, when the meter detects a demand near area of high tariff, embodiments of the present invention issue an alert to warn the user or administrator. Similarly, the embodiments of the present invention or ONT issue meter management commands to meter(s), such as electricity meter, gas meter, water meter (gage), pressure gage, et cetera, for remotely controlling and adjusting meters' settings. To configure a meter, ONT issues management commands to the meter (s) via RS-232 connections. With management capabilities of the electricity meters and various household appliances, ONT, in one embodiment, facilitate more efficient power usage for the end user in accordance with the collected load profile.

In an operation, computer 334 issues a request of load profile for the usage of electricity and natural gas of premise 304 to OLT 306 via base station 308 and NBI 330. Upon receipt of profile retrieving command from OLT 306, ONTs 320-322 send converted profile retrieving command to electricity meter 310 and gas meter 312 via RS232 serial ports. After retrieving load profiles representing both electricity usage and gas usage, ONTs 320-322 forward load profiles to OLT using OMCI message(s). After processing and converting the load profiles transmitted from ONTs 320-322, OLT 306 sends the load profile to computer 334 via base station 308. Upon displaying the load profiles on computer 334, the user can adjust the usage of electricity and natural gas in premise 304 according to the received load profiles. Note that premise 304 can be a residential house, commercial building, factory facilities, power plant, or city power management.

Figure 4:
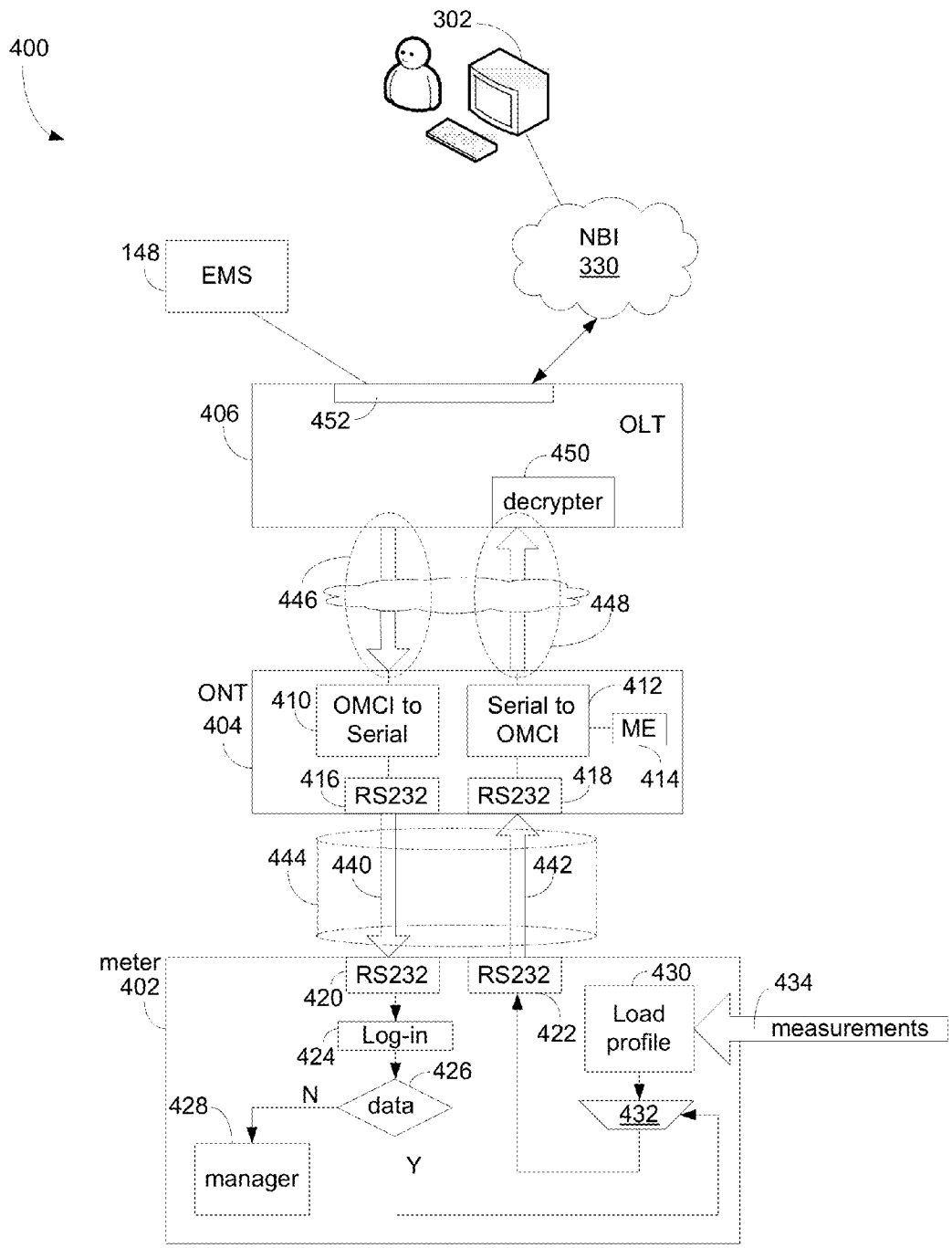
FIG. 4 is a logic diagram illustrating a process capable of remotely retrieving data from a meter via a communications network in accordance with one embodiment of the present invention.

FIG. 4 is a logic diagram 400 illustrating a process capable of remotely retrieving data from a meter via a communications network in accordance with one embodiment of the present invention. Diagram 400 includes an OLT 406, an ONT 404, and a meter 402. OLT 406, ONT 404, and meter 402 are coupled by connections 440-448. OLT 406 is also coupled with EMS 148 and user 302 via NBI 330. It should be noted that the underlying concept of the embodiment does not change if one or more functional devices were added to or removed from diagram 400.

ONT 404, in one embodiment, includes converts 410-412 and serial ports 416-418 wherein serial ports 416-418 can be RS232 ports. Convert 410 is configured to convert data from OMCI message to serial binary format while convert 412 converts serial binary data to OMCI message. Upon receiving OMCI message downstream from OLT 406 via connection 446, ONT 404 converts data from OMCI message to serial binary single-ended data format before the data travels to RS232 port 416. Note that downstream OMCI message may be initiated from user 302 or EMS 148.

Meter 402 receives the data in serial binary single-ended data format from RS232 port 420 via a serial connection 440. After authentication by log-in module 424, the data is checked at block 426 to determine whether the data is related to management or data retrieving. If the data is related to management, the data is forwarded to manager 428 for management processing. Alternatively, load profile module 430, which may be continuously or frequently updated by new measurements 434, releases available load profile to multiplex 432 which subsequently gates the load profile to RS232 port 422.

Upon traveling through serial connection 442, ONT 404 obtains the load profile from RS232 418 and subsequently converts the load profile from serial binary data format to OMCI message at block 412. If the load profile is not yet to be transferred, it is stored in managed entity ("ME") or a vendor specific ME 414. The load profile is shipped to OLT 406 via connection 448 upon request. After processing and decrypting the load profile, the load profile is forwarded to its destination via port 452.

While connections 446 and 440 can be considered as downstream path, connections 442 and 448 are considered as upstream path. Connections 446-448 can be combined into a single connection or a single fiber, while connections 440-442 can also be combined into a single serial binary connection 444. It should be noted that meter 402 can be an electricity meter, gas meter, oil meter, water meter, and the like.

FIG. 5 illustrates OMCI messages 500 transmitted between a meter(s) and a network device through a communications network in accordance with one embodiment of the present invention. Message 502 illustrates an initiation command in OMCI format sent from OLT to ONT requesting power status. Message 504 is issued by ONT to OLT to establish a communication and/or a handshaking process. If the handshaking process is successful, messages 506-512 including data collected from one or more meters organized in OMCI format are transmitted from ONT to OLT.

To retrieve load profile stored in an electricity meter, an ONT initiates a string of predefined scripts or commands and sends the scripts to the meter via one or more RS232 ports. It should be noted that the syntax of commands should follow the syntax of the targeting meter including the authentication process. The authentication process prevents unauthorized personnel to access meter's command line and/or system menus. Note that the initiation of retrieving load profile command is triggered by an OMCI set or Create Message sent from an OLT.

OLT, in one aspect, receives the request for load profile from either an EMS or a user via an NBI device. Upon retrieving the output of the load profile information, ONT stores the retrieved output data in a vendor specific ME (Managed Entity) created by ONT with pre-defined attributes. After receipt of collected data or load profile in OMCI Message, OLT reports the data to either EMS or Management System via NBI. Note that the message or load profile is decrypted at OLT before it is sent to the user whereby the decrypted data is recognizable by the user.

The exemplary embodiment of the present invention includes various processing steps, which will be described below. The steps of the embodiment may be embodied in machine or computer executable instructions. The instructions can be used to cause a general purpose or special purpose system, which is programmed with the instructions, to perform the steps of the exemplary embodiment of the present invention. Alternatively, the steps of the exemplary embodiment of the present invention may be performed by specific hardware components that contain hard-wired logic for performing the steps, or by any combination of programmed computer components and custom hardware components. While embodiments of the present invention will be described with reference to the Internet, the method and apparatus described herein is equally applicable to other network infrastructures or other data communications environments.

Figure 6:
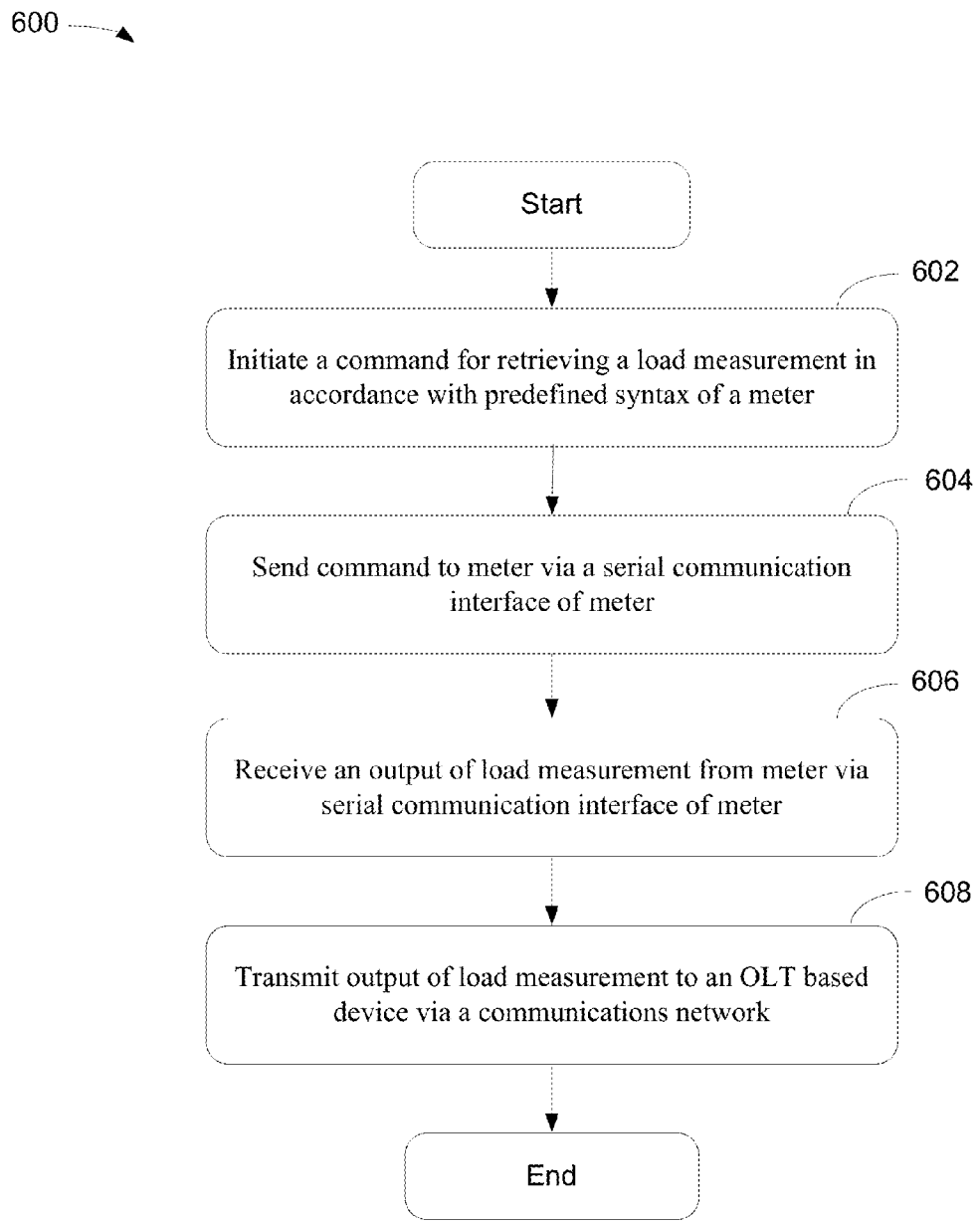
FIG. 6 is a flowchart illustrating a measurement retrieving process using a serial communication interface in accordance with one embodiment of the present invention.

FIG. 6 is a flowchart 600 illustrating a measurement retrieving process using a serial communication interface in accordance with one embodiment of the present invention. At block 602, a process for reading a meter initiates a command for retrieving a load measurement in accordance with pre-defined syntax of the meter. The request of load profile, in one example, may be issued by a user wherein the user may be located across a communications network such as the Internet. Note that predefined scripts should comply with the syntax of the meter.

At block 604, the process sends the command to the meter via a serial communication interface of the meter. In one aspect, the process is capable of transmitting predefined scripts to the meter via a RS232 port.

At block 606, the process receives an output of the load measurement from the meter via the serial communication interface of the meter. For example, a load profile representing usage of electricity is obtained from the RS232 port of the meter. Alternatively, a load profile representing usage of gas may be obtained from the RS232 port of the meter.

At block 608, the process is able to transmit the output of the load measurement to an OLT based device via a communications network. The process forwards the output of the load measurement to the user via NBI. In one example, the process is able to organize the output data in accordance with OMCI message and subsequently send the output to the OLT base device via an optical communications network.

While particular embodiments of the present invention have been shown and described, it will be obvious to those of ordinary skills in the art that based upon the teachings herein, changes and modifications may be made without departing from this exemplary embodiment(s) of the present invention and its broader aspects. Therefore, the appended claims are intended to encompass within their scope all such changes and modifications as are within the true spirit and scope of this exemplary embodiment(s) of the present invention.

What is claimed is:

1. A communication network system, comprising:
    a solid-state meter configured to convert a measurement into serial binary single-ended data, and having a serial communication interface capable of forwarding the serial binary single-ended data;
    a meter network management device coupled to the solid-state meter via a serial binary transmission cable configured to transmit serial binary single-ended data and configured to receive the serial binary single-ended data from the solid-state meter via the serial binary transmission cable, wherein the meter network management device includes a converter configured to convert electrical signals representing the serial binary single-ended data into optical signals and forwards the optical signals via an optical network; and
    an optical line terminal ("OLT") based device coupled to the meter network management device via the optical network and capable of receiving the optical signals from the meter network management device and subsequently converting the optical signals to electrical signals which represent the measurement.

2. The system of claim 1, further comprising a network management system ("NMS") coupled to the OLT based device and configured to provide communication between the OLT based device and a user via a network system.

3. The system of claim 2, wherein a solid-state meter is an electricity meter configured to measure usage of electricity.

4. The system of claim 1, wherein a solid-state meter is a natural gas meter configured to measure usage of natural gas.

5. The system of claim 1, wherein a solid-state meter is a water meter configured to measure usage of water.

6. The system of claim 1, wherein a solid-state meter is an oil meter configured to measure usage of oil.

7. The system of claim 3, wherein a solid-state meter configured to provide a measurement and having a serial communication interface includes a serial communication interface able to facilitate communication in serial binary single-ended data.

8. The system of claim 7, wherein an OLT based device coupled to the solid-state meter is able to transfer the measurement to the user via one of wired communications network and wireless communications network.

9. The system of claim 1, wherein a meter network management device is an optical network terminal ("ONT") having a serial communication interface capable of coupling with the solid-state meter for transferring serial binary single-ended data.

10. A method for reading a meter, comprising:
    initiating a command for retrieving a load measurement in accordance with predefined syntax of a meter;
    sending the command from an optical network terminal ("ONT") to a serial communication interface of the meter via a serial connection cable which is capable of transmitting information in a serial binary data format;
    converting the load measurement to serial binary single-ended data representing an output of the load measurement;
    receiving the output of the load measurement from the serial communication interface of the meter to a serial port of the ONT via the serial connection cable;
    converting the output of the load measurement from electrical signals to optical signals; and
    transmitting the optical signals of the output of the load measurement from the ONT to an optical line terminal ("OLT") based device via an optical communications network.

11. The method of claim 10, further comprising receiving a request of load profile from a user situated across a communications network.

12. The method of claim 11, further comprising forwarding the output of the load measurement to the user via North Bound Interface.

13. The method of claim 10, wherein initiating a command for retrieving a load measurement in accordance with predefined syntax of a meter includes preparing a plurality of predefined scripts coded in a syntax complied with the meter.

14. The method of claim 13, wherein sending the command to the meter via a serial communication interface of the meter includes transmitting the plurality of predefined scripts to a serial communication interface of the meter.

15. The method of claim 14, wherein receiving an output of the load measurement from the meter via the serial communication interface of the meter includes obtaining a loading profile representing usage of electricity from the serial communication interface of the meter.

16. The method of claim 14, wherein receiving an output of the load measurement from the meter via the serial communication interface of the meter includes obtaining a loading profile representing usage of gas from the serial communication interface of the meter.

17. The method of claim 13, wherein transmitting the output of the load measurement to an OLT based device via a communications network includes organizing the output in accordance with ONT management control interface ("OMCI") protocol; and sending the output to the OLT base device via an optical communications network.

18. A communication network system, comprising:
a solid-state meter capable of measuring usage of electricity by a premise, wherein the solid-state meter includes a serial binary communication port for facilitating a serial binary communication, wherein the solid-state meter is able to generate serial binary single-ended data to represent measured usage of electricity;
an optical network terminal ("ONT") coupled to the solid-state meter via a serial connection cable which transmits data in a serial binary single-ended data format, and configured to receive the serial binary single-ended data from the solid-state meter via the serial connection, wherein the ONT includes a converter able to convert electrical signals representing the serial binary single-ended data to optical signals and forward the optical signals via an optical network; and
an optical line terminal ("OLT") based network device coupled to the solid-state meter and capable of receiving the optical signals from the ONT and subsequently converting the optical signals to electrical signals which represent the measured usage of electricity.

19. The communication network system of claim 18, wherein the ONT includes a serial communication interface capable of transmitting serial binary single-ended data from the solid-state meter.

20. The communication network system of claim 19, wherein the ONT includes a conversion module capable of converting user's command formatted in open manage client instrumentation ("OMCI") protocol to a protocol complied with syntax of solid-state meter.

* * * * *